(12) United States Patent
Dobkin et al.

(10) Patent No.: US 8,631,364 B1
(45) Date of Patent: Jan. 14, 2014

(54) CONSTRAINING VLSI CIRCUITS

(75) Inventors: Rostislav (Reuven) Dobkin, Yokneam Illit (IL); Leonid Brook, Haifa (IL)

(73) Assignee: VSYNC Circuits Ltd., Yokneam Illit (IL)

( * ) Notice: Subject to any disclaimer, the term of this patent is extended or adjusted under 35 U.S.C. 154(b) by 0 days.

(21) Appl. No.: 13/337,170

(22) Filed: Dec. 26, 2011

Related U.S. Application Data

(60) Provisional application No. 61/427,182, filed on Dec. 26, 2010.

(51) Int. Cl.
*G06F 17/50* (2006.01)

(52) U.S. Cl.
USPC ........... 716/100; 716/101; 716/104; 716/106; 716/108

(58) Field of Classification Search
USPC .................................. 716/100–108
See application file for complete search history.

(56) References Cited

U.S. PATENT DOCUMENTS

| | | | |
|---|---|---|---|
| 5,870,308 A | 2/1999 | Dangelo et al. | |
| 6,169,968 B1 | 1/2001 | Kabuo | |
| 6,836,877 B1 | 12/2004 | Dupenloup | |
| 7,248,661 B1 * | 7/2007 | Almog et al. | 375/358 |
| 7,328,421 B1 | 2/2008 | Ballagh et al. | |
| 7,779,286 B1 * | 8/2010 | Pritchard et al. | 713/400 |
| 7,779,322 B1 | 8/2010 | Wang et al. | |
| 7,870,528 B2 | 1/2011 | Ja et al. | |
| 7,908,574 B2 | 3/2011 | Larouche et al. | |
| 7,962,886 B1 * | 6/2011 | Pandey et al. | 716/136 |
| 7,984,404 B2 | 7/2011 | Do et al. | |
| 8,117,577 B1 | 2/2012 | Vadi et al. | |
| 8,271,918 B2 | 9/2012 | Kwok et al. | |
| 8,418,092 B2 | 4/2013 | Basto et al. | |
| 8,448,111 B2 | 5/2013 | Mneimneh et al. | |
| 2003/0192023 A1 | 10/2003 | Murphy | |
| 2004/0221249 A1 * | 11/2004 | Lahner et al. | 716/4 |
| 2004/0225974 A1 | 11/2004 | Johnson | |
| 2005/0097484 A1 | 5/2005 | Sarwary et al. | |
| 2005/0268258 A1 * | 12/2005 | Decker | 716/4 |
| 2005/0273735 A1 * | 12/2005 | Dargelas | 716/4 |
| 2006/0190754 A1 | 8/2006 | Dargelas et al. | |
| 2006/0282808 A1 * | 12/2006 | Byrn et al. | 716/6 |
| 2007/0271538 A1 | 11/2007 | Douady et al. | |
| 2008/0008021 A1 | 1/2008 | Sarwary et al. | |
| 2008/0301601 A1 | 12/2008 | Ng et al. | |
| 2008/0313578 A1 * | 12/2008 | Maixner et al. | 716/3 |

(Continued)

OTHER PUBLICATIONS

Chen et al., "A Comprehensive Approach to Modeling, Characterizing and Optimizing for Metastability in FPGAs", Proceedings of the ACM/SIGDA 18th International Symposium on Field Programmable Gate Arrays, pp. 167-176, Monterey, USA, Feb. 21-23, 2010.

(Continued)

*Primary Examiner* — Paul Dinh
(74) *Attorney, Agent, or Firm* — D. Kligler I.P. Services Ltd.

(57) ABSTRACT

A method of circuit design performed in which a description of a multi-clock-domain circuit is analyzed to locate clock domain crossings. A processor automatically identifies, for at least one of the located clock domain crossings, one or more elements of a synchronization circuit of the clock domain crossing, which require constraining. The processor then generates a constraint for implementation of the identified one or more elements in a design of the circuit.

21 Claims, 6 Drawing Sheets

(56) References Cited

U.S. PATENT DOCUMENTS

| | | | |
|---|---|---|---|
| 2008/0313579 | A1 | 12/2008 | Larouche et al. |
| 2009/0235222 | A1 | 9/2009 | Raje et al. |
| 2010/0180240 | A1 | 7/2010 | Davis et al. |
| 2010/0306725 | A1 | 12/2010 | Kawasaki |
| 2010/0315134 | A1* | 12/2010 | Murari .................. 327/145 |
| 2010/0322365 | A1 | 12/2010 | Dobkin et al. |

OTHER PUBLICATIONS

Altera Corporation, "Quartus II Handbook", vol. 1, chapter 11, year 2004.

Beer et al., "The Devolution of Synchronizers", Proceedings of the The 16th IEEE International Symposium on Asynchronous Circuits and Systems (ASYNC), pp. 94-103, Grenoble, France, May 3-6, 2010.

Dike et al., "Miller and Noise Effects in a Synchronizing Flip-Flop", IEEE Journal of Solid-State Circuits, vol. 34, No. 6, pp. 849-855, Jun. 1999.

Alfke, P., "Metastable Delay in Virtex FPGAs", Xilinx Inc Forum, Mar. 28, 2008 http://forums.xilinx.com/t5/PLD-Blog/Metastable-Delay-in-Virtex-FPGAs/ba-p/7996.

Semiat et al., "Timing Measurements of Synchronization Circuits", Proceedings of the 9th International Symposium on Asynchronous Circuits and Systems (ASYNC'03), Vancouver, Canada, May 12-15, 2003.

VSYNC Circuits Ltd Brochure, May 28, 2011.

Zhou et al., "On-chip Measurement of Deep Metastability in Synchronizers", IEEE Journal of Solid-State Circuits, vol. 43, No. 2, pp. 550-557, Feb. 2008.

U.S. Appl. No. 13/191,487, filed Jul. 27, 2011.

Ginosar, R., "Fourteen Ways to Fool Your Synchronizer", Proceedings of the 9th International Symposium on Asynchronous Circuits and Systems (ASYNC'03), Vancouver, Canada, May 12-15, 2003.

Dobkin et al., "Fast Universal Synchronizers", International Workshop on Power and Timing Modeling, Optimization and Simulation (PATMOS), pp. 199-208, Lisbon, Portugal, Sep. 10-12, 2008.

U.S. Appl. No. 13/557,215, filed Jul. 25, 2012.

Dally et al., "Digital System Engineering", Cambridge University Press, 1998.

Kleeman et al., "Metastable Behavior in Digital Systems", IEEE Design and Test of Computers, pp. 4-19, Dec. 1987.

Chu et al., "A Design Methodology for Concurrent VLSI Systems", International Conference on Computer Design: VLSI in Computers, pp. 407-410, Port Chester, Oct. 7-10, 1985.

Dobkin, R., "Synchronization Issues in Multiple-Clock Domain Designs", ChipEx 2010, Airport City, Israel, May 4, 2010.

Kapschitz et al., "Formal Verification of Synchronizers", Proceedings of CHARME 2005 Conference, pp. 363-366, Saarbrucken, Germany, Oct. 3-6, 2005.

Brown, G.M., "Verification of a Data Synchronization Circuit for All Time", Proceedings of the Sixth International Conference on Application of Concurrency to System Design (ACSD 2006), pp. 217-228, Turku, Finland, Jun. 28-30, 2006.

Bing et al., "Automatic Formal Verification of Clock Domain Crossing Signals", Proceedings of the 14th Asia and South Pacific Design Automation Conference (ASP-DAC 2009), pp. 654-659, Yokohama, Japan, Jan. 19-22, 2009.

Litterick et al., "Pragmatic Simulation-Based Verification of Clock Domain Crossing Signals and Jitter using SystemVerilog Assertions", Design and Verification Conference and Exhibition (DVCON'06), San Jose, USA, Feb. 22-24, 2006.

Dobkin et al., "Assertion Based Verification of Multiple-Clock GALS Systems", 16th International Conference on Very Large Scale Integration (VLSI-SOC), Rhodes Island, Greece, Oct. 13-15, 2008.

Kayam et al., "Symmetric Boost Synchronizer for Robust Low Voltage, Low Temperature Operation", Technical Report, Technion EE Department, year 2007.

Dobkin et a., "High Rate Data Synchronization in GALS SoCs", IEEE Transactions on VLSI, vol. 14, No. 10, pp. 1063-1074, 2006.

Dobkin et al., "Two Phase Synchronization with Sub-Cycle Latency", VLSI Integration Journal, vol. 42, No. 2, pp. 367-375, year 2009.

Jex et al., "A Fast resolving BiNMOS Synchronizer for Parallel Processor Interconnect", IEEE Journal of Solid-State Circuits, vol. 30, issue 2, pp. 133-139, Feb. 1995.

Aspen Logic Inc, "Managing Synchronizer MTBF", Aspen Logic Journal (v1.0), Feb. 25, 2009.

Synopsys Inc., "IC Compiler: the next-generation physical design system", Datasheet, year 2009.

Synopsys Inc., "DesignWare Intellectual Property: The Most Widely Used, Silicon-Proven IP", Datasheet, year 2010.

Synopsys Inc., "Leda: RTL Checker", year 2010.

Cadence Design Systems Inc., "Encounter Conformal Equivalence Checker", year 2011.

AXIOM Design Automation, "About the company", year 2010 (www.athdl.com).

Real Intent Inc., "Clock Domain Crossing Demystified: The Second Generation Solution for CDC Verification", Whitepaper, Jun. 30, 2008.

Yeung, P., "Five Steps to Quality CDC Verification", Whitepaper, Mentor Graphics Corporation, year 2007.

Atrenta Inc., "SpyGlass CDC", year 2011.

Blue Pearl Software, "Indigo: RTL Analysis", Sep. 14, 2006.

Yeager et al., "Congestion Estimation and Localization in FPGAs: A Visual Tool for Interconnect Prediction", 9th International Workshop on System-Level Interconnect Prediction (SLIP'07), Austin, USA, Mar. 17-18, 2007.

U.S. Appl. No 13/191,487 Office Action dated Jun. 21, 2013.

Dey et al., "Time for a change: making clock-domain-crossing analysis usable and useful", Chip Design Magazine, 5 pages, Oct./Nov. 2010.

U.S. Appl. No. 13/557,215 office action dated Sep. 3, 2013.

Chiorboli et al., "ADC modeling and testing", IEEE instrumentation and measurement technology conference, vol. 3, pp. 1992-1999, Hungary, May 21-23, 2001.

\* cited by examiner

CONSTRAINING VLSI CIRCUITS

CROSS-REFERENCE TO RELATED APPLICATION

This application claims the benefit under 35 USC 119(e) of U.S. Provisional Patent Application 61/427,182, filed Dec. 26, 2010, which is incorporated herein by reference in its entirety.

FIELD OF THE INVENTION

The present invention relates generally to integrated circuits and particularly to design and verification of integrated circuits.

BACKGROUND

Integrated circuits have become very complex, sometimes including millions of transistors on a single chip. Integrated circuits are therefore generally described by engineers in high level design languages, such as Hardware Description Language (HDL), and are converted automatically by a logic synthesizer into a gate level netlist, in accordance with user constraints on timing, power, area and other circuit attributes. The gate level netlist is then converted to a layout by a place and route (P & R) tool, also in accordance with user constraints.

Many elements of integrated circuits are synchronous elements which are timed by a clock signal. The faster the clock signal operates, the more operations are performed by the integrated circuit within a given time. There are, however, limitations on the speed at which circuits can operate and the clock signal should have a rate not greater than the fastest rate allowed by the circuit. Different circuits are therefore designed to operate at different clock rates, and some integrated circuits include sub-modules which operate at different clock rates. These circuits are referred to as multiple clock domain (MCD) VLSI circuits. A point at which circuits having different clock rates are interconnected is referred to as a clock domain crossing (CDC). Incorrect design of clock domain crossings may result in errors, known as "synchronization failures", which may even cause the entire integrated circuit not to operate properly.

A paper titled: "A Comprehensive Approach to Modeling, Characterizing and Optimizing for Metastability in FPGAs", by Betz et al., the disclosure of which is incorporated herein by reference, presents a function for calculating a mean time between synchronization failures (MTBF) of a CDC and requires that the MTBF be sufficiently long to avoid synchronization failures.

The high frequencies of VLSI circuits of the state of the art are so high that the decisions (e.g., optimizations) made by the logic synthesizer and the place and route (P & R) tool could dramatically affect the MTBF of a CDC, in a manner which could cause circuit instability.

A paper titled "Managing Synchronizer MTBF", by Tim Davis, Aspen Logic Journal, Feb. 25, 2009, suggests that the human engineer designing the circuit manually add to the HDL circuit description constraints which limit the ability of the logic synthesizer and the place and route (P & R) tool to generate the CDC layout in an undesired manner.

A paper by R. Dobkin, R. Ginosar and C. P. Sotiriou, titled: "High Rate Data Synchronization in GALS SoCs," IEEE Transactions on VLSI, 14(10), pp. 1063-1074, 2006, points out that some CDC synchronizers may require complex constraints which require substantial effort to generate.

US patent publication 2009/0235222 to Raje et al. describes a method for converting a circuit design for a programmable logic device (PLD) to a standard cell circuit design including automatically generating design constraints. The delay of a selected clock domain crossing is used as a hold time constraint for the paths crossing between the clock domains connected by the clock domain crossing, in order to prevent unwanted changes to the circuit.

SUMMARY

Embodiments of the present invention that are described hereinbelow provide apparatus and methods for automatically generating constraints for the logic synthesizer and the place and route (P & R) tool, based on analysis of clock domain crossings.

There is therefore provided in accordance with an embodiment of the present invention, a method of circuit design, including receiving, by a processor, a description of a multi-clock-domain circuit, locating, by the processor, clock domain crossings in the circuit, automatically identifying, by the processor, for at least one of the located clock domain crossings, one or more elements of a synchronization circuit of the clock domain crossing, which require constraining; and generating a constraint for implementation of the identified one or more elements in a design of the circuit.

Optionally, locating the clock domain crossings includes assigning a clock domain indication to elements of the circuit and identifying elements located between a plurality of clock domains. Optionally, identifying elements which require constraining for a clock domain crossing includes determining a class of a synchronization circuit of the clock domain crossing and consulting a library of synchronization circuit classes and corresponding constraining instructions.

Optionally, generating the constraint includes generating a constraint for a synthesis stage and/or indicating that one or more elements should not be optimized. Optionally, the constraint indicates that the one or more elements should not be merged and/or duplicated.

Alternatively or additionally, generating the constraint includes generating a constraint for a place and route stage. In some embodiments, generating the constraint includes generating a constraint for a data path, a control path and/or a reset path. Optionally, generating the constraint includes indicating that two or more specific flip-flops should be adjacent each other, for example should be included in a single FPGA cell.

Optionally, generating the constraint includes indicating a maximal time delay for a path of a clock domain crossing. Optionally, indicating a maximal time delay for a path of a clock domain crossing includes indicating a maximal time delay calculated as a function of a desired MTBF of the received circuit.

Optionally, generating the constraint includes indicating a false path that is not subject to time limitations. Optionally, the processor additionally performs CDC verification on the received circuit. Optionally, the processor additionally performs integration of a plurality of sub-circuits of different time domains into the received circuit. Optionally, the processor additionally identifies parallel paths which relate to different bits of a same multi-bit data connection and represents them by a single path, for the generating of the constraint. Optionally, the method includes generating a plurality of constraints and comparing the generated constraints to a set of constraints received from a user. Optionally, the method includes calculating for the multi-clock-domain circuit a percentage of CDC synchronization circuits properly constrained.

There is further provided in accordance with an embodiment of the present invention, a computer software product, including a tangible computer-readable medium in which program instructions are stored, which instructions, when read by a computer, cause the computer to receive a description of a multi-clock-domain circuit, locate in the circuit for clock domain crossings, identify for at least one of the located clock domain crossings, one or more elements of a synchronization circuit of the clock domain crossing, which require constraining; and generate a constraint for the identified one or more elements.

There is further provided in accordance with an embodiment of the present invention, apparatus for circuit design, including an input interface for receiving a description of a multi-clock-domain circuit, and a processor configured to locate clock domain crossings in the circuit, to automatically identify for at least one of the located clock domain crossings, one or more elements of a synchronization circuit of the clock domain crossing, which require constraining and to generate a constraint for implementation of the identified one or more elements in a design of the circuit.

Optionally, the input interface is configured to receive a list of constraints for a circuit and wherein the processor is configured to compare constraints it generated for the circuit with the received list of constraints.

There is further provided in accordance with an embodiment of the present invention a method of circuit design, including receiving, by a processor, a description of a circuit, identifying parallel paths which relate to different bits of a same multi-bit data connection in the description of the circuit; and replacing the identified parallel paths by a single path, in the description of the circuit, so as to generate a modified description. Optionally, the method includes generating constraints for the circuit based on the modified description.

The present invention will be more fully understood from the following detailed description of the embodiments thereof, taken together with the drawings in which:

DETAILED DESCRIPTION OF EMBODIMENTS

An aspect of some embodiments of the invention relates to a constraint generator which is adapted to locate clock domain crossings (CDCs) in a circuit, to identify types of synchronization circuits of the clock domain crossings and to generate constraints for the CDCs according to their identified types.

The constraint generator may be a stand alone unit or may be combined with circuit design tools which perform other tasks, such as a CDC verification tool and/or a circuit integrator.

An aspect of some embodiments of the invention relates to a circuit handling tool configured to identify parallel signal paths performing the same task and/or having the same structure and logically bundling the identified signal paths together for common manipulation by circuit design tools, such as a constraint generator and/or sub-circuit classification tools. In some embodiments of the invention, the bundling is used to combine user notifications which relate to parallel branches of a single circuit into a single user notification.

System Overview

Figure 1:
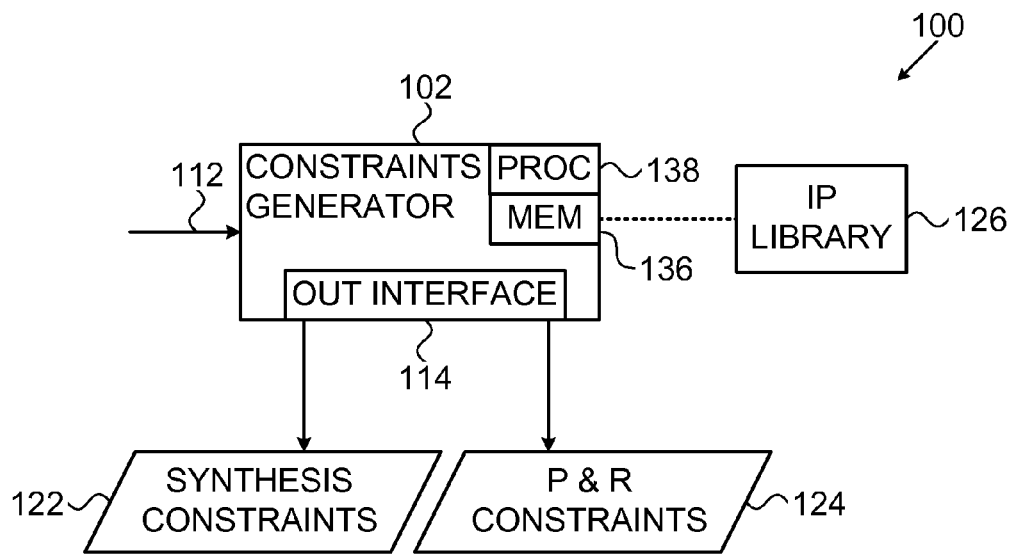
FIG. 1 is a schematic block diagram of a VLSI design system, in accordance with an embodiment of the invention.

FIG. 1 is a schematic block diagram of a VLSI design system 100, in accordance with an embodiment of the invention. System 100 comprises a constraint generator 102 which receives circuit information through an input interface 112 and generates synthesis constraints 122 and/or place and route (P&R) constraints 124, provided through an output interface 114 or used internally in performing other tasks.

Constraint generator 102 typically comprises a general-purpose computer or a cluster of such computers, with suitable interfaces, one or more processors 138, and software for carrying out the functions that are described herein, stored, for example, in a memory 136. Memory 136 optionally hosts information required by constraint generator 102 in performing its tasks, such as an IP library 126 of CDC synchronization circuits. IP library 126 optionally includes CDC circuits for different types of CDCs, including, for example, data CDCs, reset CDCs, clock gating CDCs and switching circuit CDCs.

The software of constraint generator 102 may be downloaded to the computer in electronic form, over a network, for example. Alternatively or additionally, the software may be held on tangible, non-transitory storage media, such as optical, magnetic, or electronic memory media. Further alternatively or additionally, at least some of the functions of constraint generator 102 may be performed by dedicated or programmable hardware logic circuits. For the sake of simplicity and clarity, only those elements of constraint generator 102 that are essential to an understanding of the present invention are shown in the figures.

Input interface 112 may receive circuit information in a hardware definition language (HDL) such as Verilog, VHDL, System Verilog, AHDL (Altera Hardware Description Language), iHDL and/or system-C. The description is optionally received in a register transfer level (RTL) or in a netlist or gate level. The integrated circuit may be of substantially any type, including ASIC (Application Specific Integrated circuit), FPGA (Field Programmable Gate Array) and CPLD (Complex Programmable Logic Device).

Constraint generator 102 optionally also receives parameters of the circuit design, such as clock rates, port data rates, operating conditions and target technology attributes.

The computer hosting constraint generator 102 may perform additional VLSI related tasks together with the generation of the constraints, as is now described with reference to FIGS. 2 and 3.

Figure 2:
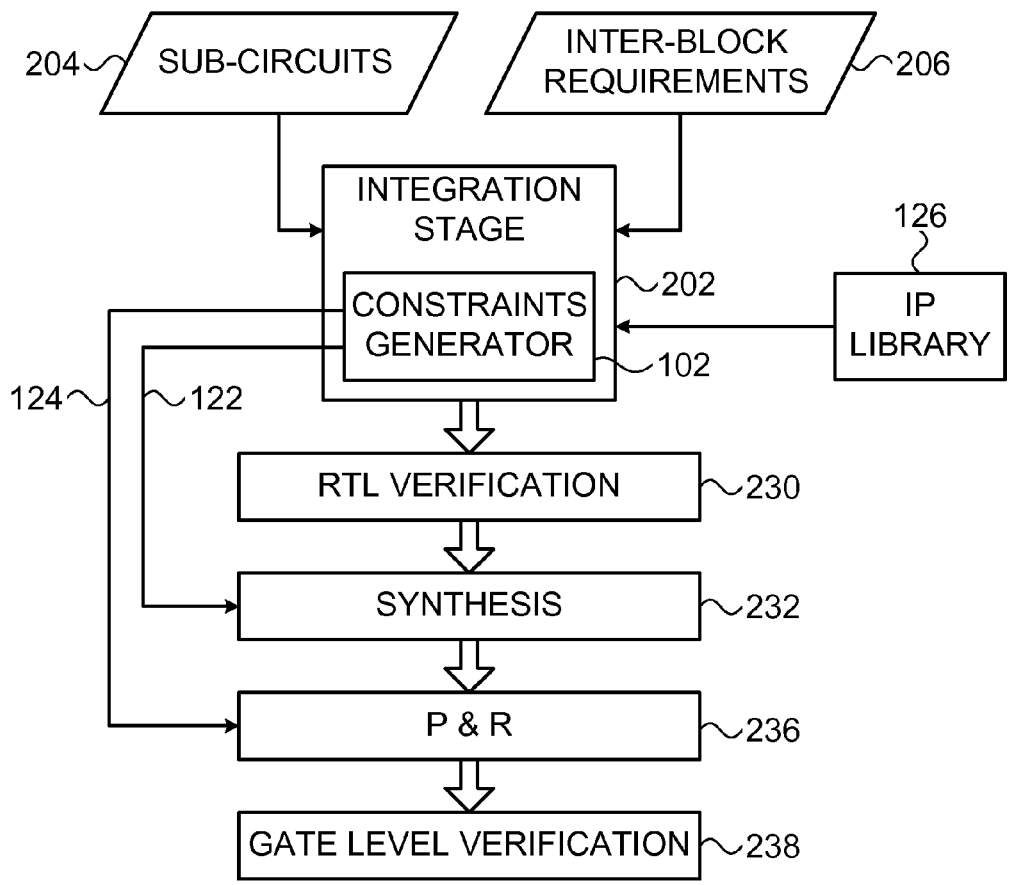
FIG. 2 is a schematic block diagram of tasks performed in generating a VLSI layout, in accordance with an embodiment of the invention.

FIG. 2 is a schematic block diagram of tasks performed in generating a VLSI layout, in accordance with an embodiment in which constraint generator 102 operates with a circuit integrator. In the embodiment of FIG. 2, an integration stage 202 receives a plurality of sub-circuits 204 and inter-block communication requirements 206 and generates a multiple clock-domain integrated circuit 208, determining relative layouts of the received sub-circuits 204 and constructing clock domain crossing (CDC) synchronization circuits, using IP library 126, for example. In accordance with embodiments of the present invention, constraint generator 102 generates synthesis constraints 122 and/or P&R constraints 124 in the integration stage 202. The multiple clock-domain integrated circuit 208 then undergoes RTL verification 230, after which synthesis 232 is performed. The synthesis is optionally performed in accordance with the synthesis constraints 122 provided by constraint generator 102. A resulting synthesized circuit undergoes a place and route (P&R) stage 236, which takes into account the P&R constraints 124 from constraint generator 102. The circuit then generally undergoes gate-level verification 238, as is known in the art.

Each of RTL verification 230, synthesis 232, place and route (P&R) stage 236 and gate-level verification 238 may be performed internally on the computer that hosts constraint generator 102 or externally on a different computer.

Figure 3:
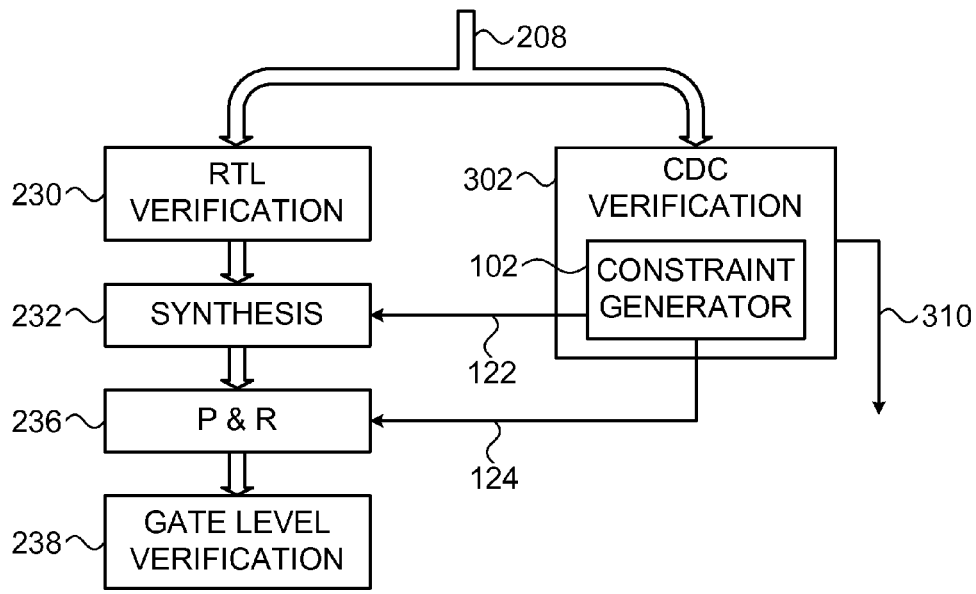
FIG. 3 is a schematic block diagram of tasks performed in generating a VLSI layout, in accordance with another embodiment of the invention.

FIG. 3 is a schematic block diagram of tasks performed in generating a VLSI layout, in accordance with an embodiment in which constraint generator 102 operates with a CDC verification unit 302. In the embodiment of FIG. 3, verification unit 302 receives a multiple clock-domain integrated circuit 208, identifies CDCs and generates warnings 310 on problematic CDCs. In addition, constraint generator 102 generates synthesis constraints 122 and/or P&R constraints 124 which are transferred to synthesis 232 and P&R stage 236.

It is noted that constraint generator 102 may be employed in both integration stage 202 and CDC verification unit 302 or in only one of the stages. Combining the constraint generator 102 to integration stage 202 simplifies the identification of most CDC synchronization circuits, as the information may be received directly from integration stage 202. On the other hand, some CDC synchronization circuits may be located within complete sub-circuits received by the integration stage 202 from an external design unit. These CDCs may not be identified by integration stage 202 and therefore may not be constrained if a CDC verification unit 302 is not used.

Figure 4:
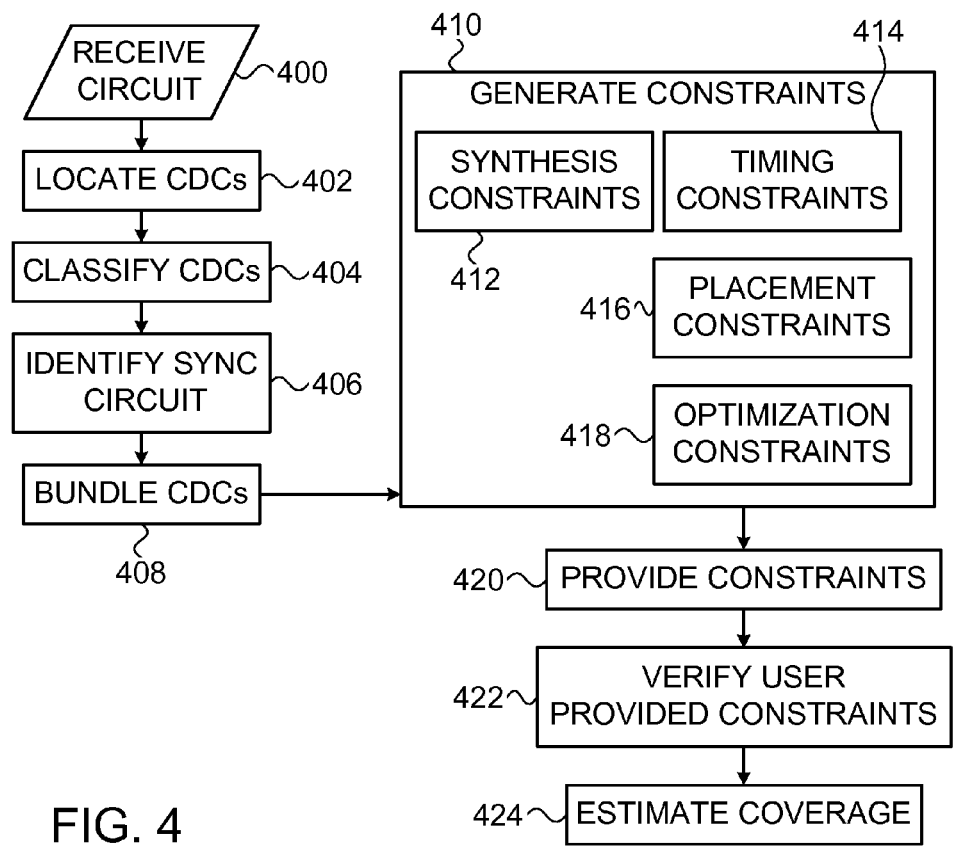
FIG. 4 is a flowchart of acts performed by a constraint generator, in accordance with an embodiment of the invention.

FIG. 4 is a flowchart of acts performed by a constraint generator 102, in accordance with an embodiment of the invention. For a received (400) circuit, constraint generator 102 locates (402) the CDCs in the circuit, classifies (404) the located CDCs to determine whether they require constraining and identifies (406) the synchronization circuits and/or portions thereof which require protection.

In some embodiments of the invention, constraint generator 102 searches for CDCs belonging to a same sub-circuit and bundles (408) the CDCs together so that they are constrained and/or otherwise handled together. The bundling (408) may be performed before, during and/or after the classification (404) and/or the identification (406) of the synchronization circuits of the CDCs.

Constraints are then generated (410) for the CDCs. The generated constraints may include synthesis level constraints (412) and/or P&R level constraints, such as timing constraints (414), placement constraints (416) and/or MTBF optimization constraints (418). In some embodiments of the invention, constraint generator 102 generates all the constraints for each CDC, unless the CDC is determined not to require one or more specific constraints. In other embodiments, only a single P&R level constraint is generated for each CDC element by default. Optionally, a human user may indicate which constraints are to be generated for each specific circuit.

The generated constraints are provided (420) to their intended respective design levels which may be internal within a computer hosting constraint generator 102 or in an external unit, in which case the constraints are provided through output interface 114. Naturally, some of the constraints may be used internally while others are provided to an external unit.

In some embodiments of the invention, constraint generator 102 receives user generated constraints for the circuit, if such constraints are provided, and verifies (422) their correctness. Alternatively or additionally, constraint generator 102 estimates (424) the coverage of the constraints.

CDC Identification

Referring in detail to locating (402) the CDCs in the circuit, in some embodiments the identification is performed by dividing the circuit into clock domain areas according to the clock source that controls the operation of the elements in the area and identifying lines connecting two different clock domain areas. The CDC identification may be performed, for example, using any of the methods described in U.S. patent application Ser. No. 13/191,487, filed Jul. 27, 2011 and assigned to the assignee of the present application, the disclosure of which is incorporated herein by reference, and/or in US patent publication 2005/0097484 to Sarwary et al., the disclosure of which is incorporated herein by reference.

Alternatively or additionally, for example in embodiments in which constraint generator 102 operates with an integration stage 202, constraint generator 102 receives indications of CDCs from a different program or stage, through an internal or external interface. The indications of CDCs may be received with the received circuit or separately.

The classification (404) of the CDCs and identification (406) of their synchronization circuits optionally includes comparing the circuits in the area of located CDCs to synchronization circuits in IP library 126. CDCs for which a match is found are classified (404) according to the match and their synchronization circuits are optionally identified (406) based on indications in IP library 126. The various classes may include, for example, different types of N-Flop synchronizers, first in first out (FIFO) synchronizers, data path synchronizer, mesochronous synchronizers, etc. The various classes optionally include data path CDCs in which data signals pass between clock domains, control path CDCs in which control signals pass between clock domains and reset path CDCs, connecting a first clock domain to an asynchronous reset pin in a second, different, clock domain.

CDCs for which a classification was not determined are marked as unclassified. Alternatively or additionally, classification (404) includes comparing the located CDCs to classification rules. For example, CDCs matching a specific set of rules provided for N-flop synchronizers, are classified as N-flop synchronizers, and rules provided therewith indicate which elements thereof need constraining. The comparison and classification may be performed using any method known in the art, including the methods described in above mentioned U.S. patent application Ser. No. 13/191,487.

In some embodiments of the invention, a human user may indicate unclassified CDCs and/or classified CDCs as waived. The human user may provide specific indication of CDCs to be waived or may provide rules on CDCs to be waived, such as CDCs that relate to non-functional paths and/or CDCs having a very low MTBF requirement, for example because the logic following the CDC is able to handle CDC failures. Optionally, CDCs indicated as waived are removed from further consideration as not requiring constraining. Alternatively, waived CDCs are constrained to prevent the synthesis 232 and/or P&R stage 236 from wasting resources on them in performing static timing analysis (STA). Optionally, the constraining of waived CDCs is performed by defining a "false-path" constraint, for example using the following code:

set_false_path—from <hierarchy path>|qs—to <hierarchy path>|qa where qs is the identity of the first element in the waived clock domain crossing path circuit and qa is the identity of the last element in the waived clock domain crossing path.

The human user may optionally also indicate the correct classification of CDCs that constraint generator 102 was not able to classify automatically, by indicating a matching CDC in IP library 126 or by indicating the structure of the CDC synchronization circuit. In some embodiments of the invention, the user indications are used to add the user classified CDC to IP library 126.

Constraint Generation

In some embodiments of the invention, the constraints are generated automatically by a processor without user intervention. In other embodiments, the constraints are generated in a semi-automatic procedure. Constraint generator 102 identifies CDCs which may require constraining and presents them to a human user along with one or more suggested constraints and the user selects for each identified CDC whether to constrain the CDC and/or which constraint to use.

Optionally, the constraints are stored as HDL code templates in library 126 according to the CDC classifications and are retrieved from the library according to the determined classifications. Constraint generator 102 fills in the templates according to the specific details of the synchronization circuit and of the production process.

The parameters of the production process (e.g., the sizes of the cells used in FPGA, whether cells of FPGA allow flip-flops receiving different clock signals, required MTBF, W and τ) are optionally received from the user with the circuit or are optionally obtained from a pre-defined data-base, such as described for example in above mentioned U.S. patent application Ser. No. 13/191,487. The parameters of the specific CDC synchronization circuit (e.g., the number of flip-flops in the synchronization chain of an N-flip-flop synchronization circuit) are determined according to the classification of the CDC synchronization circuit and/or are determined from analysis of the circuit.

Synthesis Level Constraints

Figure 5:
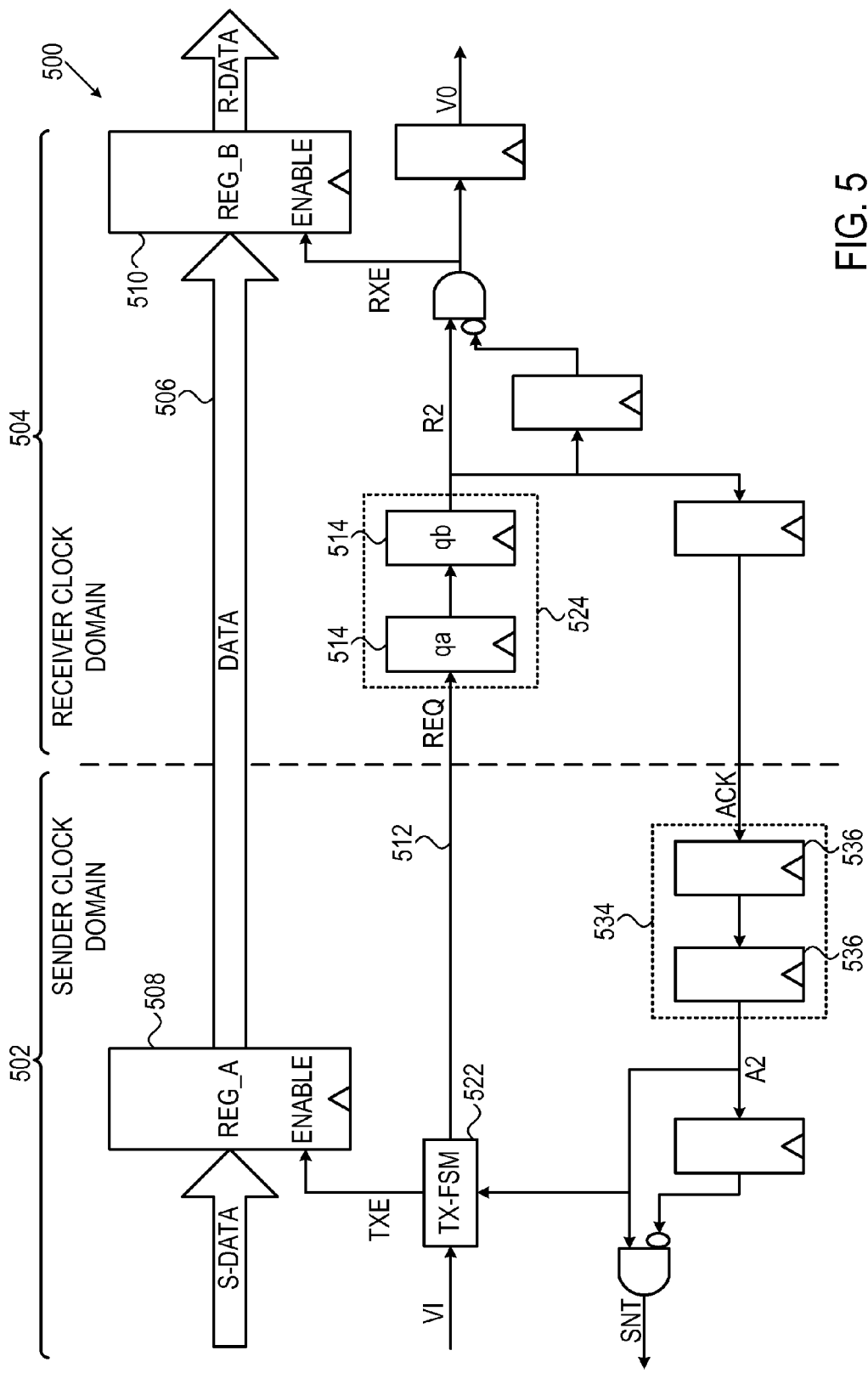
FIG. 5 is a schematic block diagram of a CDC synchronization circuit, to be constrained in accordance with embodiments of the present invention.

FIG. 5 is a schematic block diagram of a CDC synchronization circuit 500, to be constrained in accordance with embodiments of the present invention. Synchronization circuit 500 connects between a sender area 502 in a first clock domain and a receiver area 504 in a second clock domain. The synchronization circuit 500 generally includes a data path 506 which leads from a sender register 508 (marked as REG A) to a receiver register 510 (marked as REG B). In addition to the data to be passed on the data path 506, synchronization circuit 500 receives a valid input (VI) pulse, which indicates that data has been supplied. In response to the pulse, a transmitter finite state machine (TX-FSM) 522 generates a pulse on an enable line of sender register 508 (marked TXE in FIG. 5), which locks the data in sender register 508. In addition, TX-FSM 522 generates a level control signal which is transferred to the receiver area 504 on a control path 512. Control path 512 includes a sequence 524 of flip-flops 514, which synchronize the transfer between clock domains. When the control signal from TX-FSM 522 reaches the end of the a sequence 524 of flip-flops, it allows the data into receiver register 510, indicates the data reception on a valid output (VO) line and provides a feedback signal to the sender area 502. The feedback signal is passed between clock domains through a sequence 534 of flip-flops 536. A complete single transfer cycle of synchronization circuit 500, includes asserting high REQ 512, asserting high ACK, asserting low REQ and then asserting low ACK; the above is known in the art as a four-phase handshake protocol.

In FIG. 5 sequences 524 and 534 include two flip-flops each, but other synchronization circuits may include more or less flip-flops, when the flip-flops can be either triggered by rising or falling edges of the clocks. In any specific synchronization circuit, sequences 524 and 534 may include the same number of flip-flops or different numbers of flip-flops.

It is noted that reference is made in the following description to elements in the circuit example of FIG. 5 and particularly regarding flip-flops 514. It will be understood that these references are only for illustration, as IP library 126 will generally include many different synchronization circuits with different structures. In addition, the constraints described below regarding flip-flops 514 are generally applied also to flip-flops 536 on the feedback line.

Referring in detail to generating (412) constraints for the synthesis level, in some embodiments of the invention, generating the constraints for a classified CDC comprises providing indications that the flip-flops in synchronization chains (e.g., sequences 524 and 534) of the synchronization circuit of the CDC should not be merged with other elements of the circuit, should not be retimed and/or should not be duplicated (e.g., in cases of high fan-out).

Following is an example of a code patch which may be used for constraining of two flip-flops qa and qb.

—Constraining a Synchronizer Path of 2-Flip-Flop Synchronizer:— a. the synchronizer registers should not be merged with others.
attribute dont_merge of qa: signal is true;
attribute dont_merge of qb: signal is true;
b. the synchronizer registers should not be retimed.
attribute dont_retime of qa: signal is true;
attribute dont_retime of qb: signal is true;
c. the synchronizer should not be duplicated even in case of high fan-out.
attribute dont_replicate of qa: signal is true;
attribute dont_replicate of qb: signal is true;

Alternatively, when supported, the constraints may include an indication not to perform any changes to the flip-flops of sequences 524 and 534. It is also noted that if the synthesis level does not support a type of changes, such as merging, the constraints for that type of change are not required.

Place and Route Constraints

The place and route constraints are optionally provided in the form of either placement constraints (416), timing constraints (414), and/or vendor specific constraints, such as MTBF optimization constraints (418). Alternatively, for one or more classes of CDCs a plurality of different types of constraints may be provided. The use of timing constraints (414) generally allows the place and route (P&R) stage 236 more leeway in determining the layout and prevents imposing unnecessarily strict requirements not required to meet quality requirements of the circuit.

Generating the placement constraints (416) for a CDC is optionally directed to minimize the length of the path between the flip-flops in the synchronization chain of the CDC.

In structured layouts, such as field programmable date array (FPGA) layouts, the synchronization chain flip-flops 514 are optionally constrained to be included in same or adjacent cells (e.g., configurable logic blocks (CLBs) or logic array blocks (LABs)). In some embodiments of the invention, the constraints indicate that the synchronization chain flip-flops 514 of each specific CDC should be included in a same or in adjacent cells. The P&R stage 236 then selects the specific layout that meets the constraints. Alternatively, the constraints generated by constraint generator 102 indicate whether the synchronization chain flip-flops of each specific CDC should be included in a same or in adjacent cells.

In some embodiments of the invention, constraint generator 102 constrains the synchronization chain flip-flops to a single cell, whenever possible, and only when not possible the constraints are generated to indicate that the synchronization chain flip-flops are to be placed in adjacent cells. Optionally, in these embodiments, constraint generator 102 receives an indication of the size of the FPGA cells of the process that is used. If the number of synchronization chain flip-flops required to be adjacent each other is not greater than the number of flip-flops in a single cell, the constraint is set to indicate that the synchronization chain flip-flops should be included in a single cell. Alternatively or additionally, if the FPGA used does not allow including flip-flops having different clock signals in a single cell and the synchronization chain flip-flops of a single CDC require different clock signals, the flip-flops are indicated to be included in adjacent cells, employing local interconnect.

In other embodiments, constraint generator 102 provides a constraint in the form of a maximal distance between the synchronization chain flip-flops 514, for example, between each two adjacent flip-flops and/or between the first and last flip-flops in the chain, according to the parameters of the circuit type and the type of the CDC synchronization circuit. The maximal distance may be determined using methods described hereinbelow for determining maximal time constraints.

Figure 6:
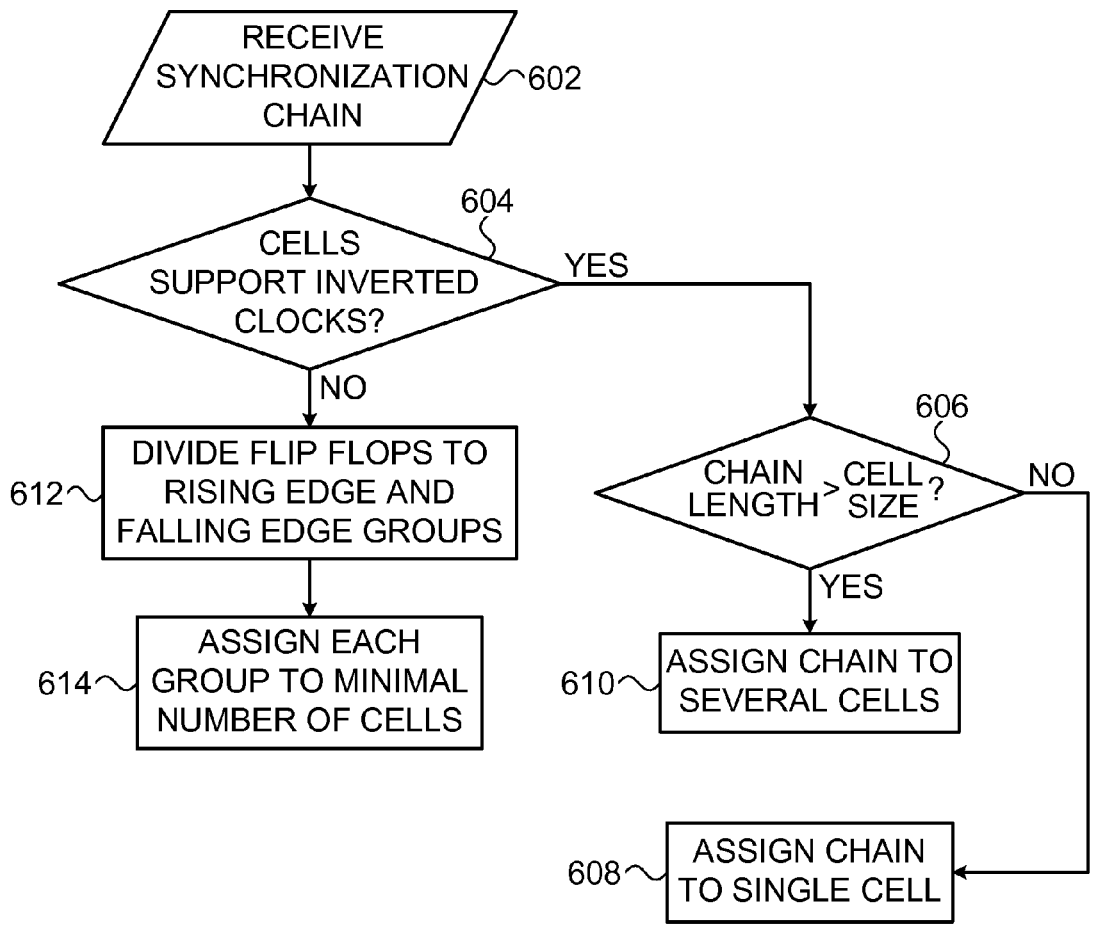
FIG. 6 is a flowchart of acts performed in determining placement of synchronization flip-flops in FPGA cells, in accordance with an embodiment of the invention.

FIG. 6 is a flowchart of acts performed in determining placement of synchronization flip-flops in FPGA cells, in accordance with an embodiment of the invention. For a received (602) synchronization chain of flip-flops 514, constraint generator 102 determines whether (604) the FPGA cells in which the flip-flops are to be placed support inverted clocks in a single cell. If (604) the cells support inverted clock flip-flops, constraint generator determines whether (606) the number of flip-flops in the chain fits into a single cell. If (606) possible, the flip-flops are assigned (608) to a single cell. Otherwise, the flip-flops are assigned to several cells, optionally the minimal number of cells required. The flip-flops are optionally assigned according to their order in the chain, such that each cell includes flip-flops adjacent in the chain. If (604) the cells do not support inverted clock flip-flops, the flip-flops are divided (612) to separate groups of rising edge flip-flops and falling-edge flip-flops. The flip-flops of each group are assigned (614) to separate cells, while minimizing the distance between cells of adjacent flip-flops in the chain.

In non-structured layouts, such as ASICs, the placement constraints optionally state for the synchronization chain flip-flops of each CDC that they should be placed in proximity to each other, possibly stating a maximal distance between each two adjacent flip-flops and/or between the first and last flip-flops in the chain. In addition, any of the methods described herein for FPGAs may be used for ASICs.

Alternatively to constraining only the synchronizer flip-flops 514, the constraints may be applied additionally to data path registers 508 and/or 510 of CDC synchronization circuits or to the entire synchronization circuit. Constraining the placement of the to data path registers is optionally applied in synchronizers for which library 126 indicates a time constraint between their control and data paths. In some embodiments of the invention, the data path registers are constrained in all synchronization circuits for which there are time constraints between their control and data paths. Alternatively, the data path registers are constrained only when calculation of the time difference between the control and data paths do not meet the constraints. It is noted that the time constraints may include a safety margin.

Following is an example of a code which may be used in constraining a synchronization circuit, given the name "sync1", in an environment of Synopsys Astro/IC Compiler P&R tool.

```
SetFormField "Create Group" "Group Name" "sync1"
SetFormField "Create Group" "Pattern" "/.*"
SetFormField "Create Group" "Pattern" "<hierarchy-path>/u_inst_sync1/.*"
FormApply "Create Group"
```

Following is an example of constraining a two-flip-flop synchronization circuit into a single FPGA cell, in accordance with an Altera Qartus II flavor:

```
# Part 1: Region definition
set_global_assignment -name LL_RESERVED OFF                     -section_id sync1_11_region
set_global_assignment -name LL_MEMBER_STATE LOCKED -section_id sync1_11_region
set_global_assignment -name LL_SOFT OFF                          -section_id sync1_11_region
set_global_assignment -name LL_AUTO_SIZE OFF                    -section_id sync1_11_region
set_global_assignment -name LL_STATE FLOATING                   -section_id sync1_11_region
set_global_assignment -name LL_ORIGIN LAB_X1_Y1                 -section_id sync1_11_region
set_global_assignment -name LL_HEIGHT 1                          -section_id sync1_11_region
set_global_assignment -name L_WIDTH 1                            -section_id sync1_11_region
# Part 2: Assigning into the region
    set_instance_assignment -name LL_MEMBER_OF sync1_11_region -to <hierarchy-path>|qa
-section_id sync1_11_region
    set_instance_assignment -name LL_MEMBER_OF sync1_11_region -to <hierarchy-path>|qb
-section_id sync1_11_region
```

In this example, a first part declares constraints for a region and a second part assigns the flip-flop of the synchronization circuit to the defined region.

Timing Constraints

Referring in detail to generating (414) timing constraints, in some embodiments of the invention, timing constraints are applied to both the data path 506 (FIG. 5) and the control path 512 of the CDC synchronization circuits. In other embodiments, constraints are applied only to the control path 512. In some embodiments of the invention, constraints are applied to the data path 506 in circuits having high interconnect congestion. Optionally, constraint generator 102 estimates the interconnect congestion of different areas of the circuit, for example using interconnect congestion prediction methods, such as described in Yeager, Chiu and Lemieux, "Congestion Estimation and Localization in FPGAs: A Visual Tool for Interconnect Prediction", SLIP'07, Mar. 17-18, 2007, and accordingly determines whether to apply constraints to the data path of each specific synchronization circuit. Alternatively or additionally, the decision of whether to provide constraints for the data path is based on the width of the path. Optionally, constraints are applied to paths having at least a predetermined number of bits, such as 128 or 256.

Optionally, the time constraint of the data path is set according to the propagation time on the corresponding control path. In some embodiments of the invention, the maximal delay for the data path is set according to the minimal delay of the control path, such that the data will always be ready when the control signal is received. For example, the Max-delay of the data path may be calculated as:

$$\text{Max-delay}_{Data} = T \times \text{SyncChainLengthinCycles} - T_{su}$$

where T is the time required to change each flop-flop in the flip-flop sequence 524 of the control path 512 and $T_{su}$ is the set-up time of the receiver register 510.

For the control path, the Max-delay set by the constraints is optionally determined based on the minimal MTBF considered safe for the circuit. The Max-delay is optionally set as a maximal set up time which still allows the given MTBF.

The following equation is optionally used to calculate the Max-delay of the control path:

$$\text{Max-delay}_{Ctrl} = T - \tau \cdot \ln(MTBF \cdot W \cdot F_c \cdot F_D) \quad (1)$$

This equation is based on the equation:

$$MTBF = \frac{e^{\frac{S}{\tau}}}{W \cdot F_C \cdot F_D} \quad (2)$$

which is generally used for the MTBF. If a different equation is used for the MTBF, the equation of the Max-delay may be adjusted accordingly.

In equation (1), W is a combined length of the set-up and hold time required in the circuit and $\tau$ is a metastability resolution time constant of the circuit. The set-up time is the time before the reading of a value that the value should be set in order to make sure the value is read correctly and the hold time is the time after the reading begins during which the value should not be changed.

Optionally, for simplicity, W and $\tau$ are assigned global values for the entire integrated circuit. Alternatively, the assigned values of W and $\tau$ depend on the internal structures of the flip-flops used, such as their sizes. In some embodiments, in early design stages, when the structures have not been determined yet, a single default value is used for all the flip-flops. Possibly, the default value used is a worst case value. Alternatively, an average value is used for the default. At a later stage, when the specific structures of the flip-flops are known, constraint generator 102 uses parameter values corresponding to the specific structures.

The value of $F_c$ is optionally set as the clock rate of the sink of the CDC. $F_D$ is optionally set by default to the frequency of the clock of the source of the CDC, which is the highest rate at which the source can provide data. Optionally, constraint generator 102 queries the user and/or otherwise receives user input on the data rate provided, and if the user provides a lower data rate, that rate is used for $F_D$. In some embodiments, $F_D$ is also a function of the type of synchronizer used, and if the synchronizer is known to require more than one cycle to transfer data signals through the synchronizer, the data rate is set to the source clock rate divided by the number of cycles required by the synchronizer to transfer data. The data rate of transferring data signals through the synchronizer is referred to as its latency. Optionally, when a FIFO synchronizer is used, $F_D$ is calculated as the minimum between the source clock and the sink clock. In some embodiments of the invention, $F_D$ is calculated using any of the methods described in R. Dobkin, R. Ginosar, "Fast Universal Synchronizers," PATMOS, pp. 199-208, 2008, the disclosure of which is incorporated herein by reference.

The value of MTBF is optionally selected according to the required reliability of the designed circuit, a higher MTBF being required for circuits requiring higher reliability, such as circuits for military and/or medical devices. Generally, constraint generator 102 receives a user defined MTBF value or receives an indication of the intended usage of the device and accordingly sets the MTBF.

Instead of setting Max-delay for each CDC based on the MTBF for a single CDC, Max-delay may be calculated based on a global MTBF of the entire circuit, which is estimated as N×MTBF, where N is the number of clock domain crossings in the entire circuit. N may be determined, for example, during the location of the CDCs 402, or may be received with the circuit.

In accordance with this alternative, Max-delay is optionally calculated using the equation:

$$\text{Max-delay} = \text{Ctrl} + T - \tau \cdot \ln(MTBF \cdot N \cdot W \cdot F_c \cdot F_D) \quad (3)$$

An example of a code for timing constraints is:
Constraining the Synchronization Chain
set_max-delay—from <hierarchy-path>|qa—to <hierarchy-path>|qb<Max-delay-Ctrl>
Constraining the Data Path Chain
set_max-delay—from <hierarchy-path>|reg_a—to <hierarchy-path>|reg_b<Max-delay-Data>

Generally, place and route (P&R) stage 236 takes the timing constraints into consideration in placing the constrained elements and/or reports the resulting time delay for time constrained paths, so that a designer is aware of locations where the timing constraints were not met.

Alternatively or additionally to providing place and route (P&R) stage 236 with timing constraints and/or placement constraints, when P&R stage 236 is configured to optimize CDC synchronization circuits based on circuit parameters, the constraints generated by constraint generator 102 indicate to the P&R stage 236 to perform the constraining. Optionally, the constraints indicate the first flip-flop of the synchronization chain, the chain length and the data rate and the constraints themselves are determined by P&R stage 236.

Following in an example of constraints provided in accordance with this alternative:

set_global_assignment -name OPTIMIZE_FOR_METASTABILITY ON
set_instance_assignment -name SYNCHRONIZER_IDENTIFICATION FORCED -to <hierarchy-path>|qa
set_instance_assignment -name SYNCHRONIZER_TOGGLE_RATE <DataRate> -to <hierarchy-path>|qa
set_instance_assignment -name SYNCHRONIZATION_REGISTER_CHAIN_LENGTH <SyncChainLength> -to <hierarchy-path>|qa

Verification and Coverage Estimate

Referring in detail to verification of user provided constraints, in some embodiments of the invention, the constraints provided by the user are compared to the constraints generated by the constraint generator 102. A verification report may provide notifications of elements and/or CDCs not constrained by the user, although determined to require constraining by constraint generator 102, and/or of elements and/or CDCs constrained by the user although determined by constraint generator 102 not to require constraints. Alternatively or additionally, the verification report may indicate different constraints provided for same elements and/or CDCs, such as different timing constraints and/or different extents of protection (e.g., one set of constraints protects only the flip-flops and the other protects the entire synchronization circuit). Further alternatively or additionally, the verification report may provide a comparison of the MTBF achieved for the different suggested constraints. In some embodiments of the invention, only differences which result in a substantial difference, such as time or MTBF difference, are listed in the verification report.

The verification of user provided constraints may be particularly useful when porting a known circuit design between different circuit types (e.g., different FPGA families, different production processes), in order to determine whether the constraints need to be updated and/or to determine the implications of the changes.

In some embodiments of the invention, constraint generator 102 may suggest corrections to the user provided constraints and/or may automatically correct the user provided constraints. This may be useful for users having their own constraint set which they trust, but want to point out possible flaws in it for human verification.

As to estimating (424) the coverage of the constraints, in some embodiments of the invention, the CDC constraints coverage is assessed by the following expression:

$$\text{Coverage} = \frac{\text{Total Number Of Constrained } CDCs}{\text{Total Number Of } CDCs}$$

The coverage value may be used by a human user to appreciate the extent of unclassified CDCs. The coverage may thus serve as an indicator of the extent of proper protection of CDCs. In some embodiments of the invention, constraint generator 102 may provide a layout showing the designed circuit with indications for CDCs not classified and/or not properly constrained.

Bundling

Referring in detail to bundling (408) CDCs belonging to a same sub-circuit together, the bundling optionally includes finding multi-bit data connections and representing them by a single multi-bit branch.

Figure 7:
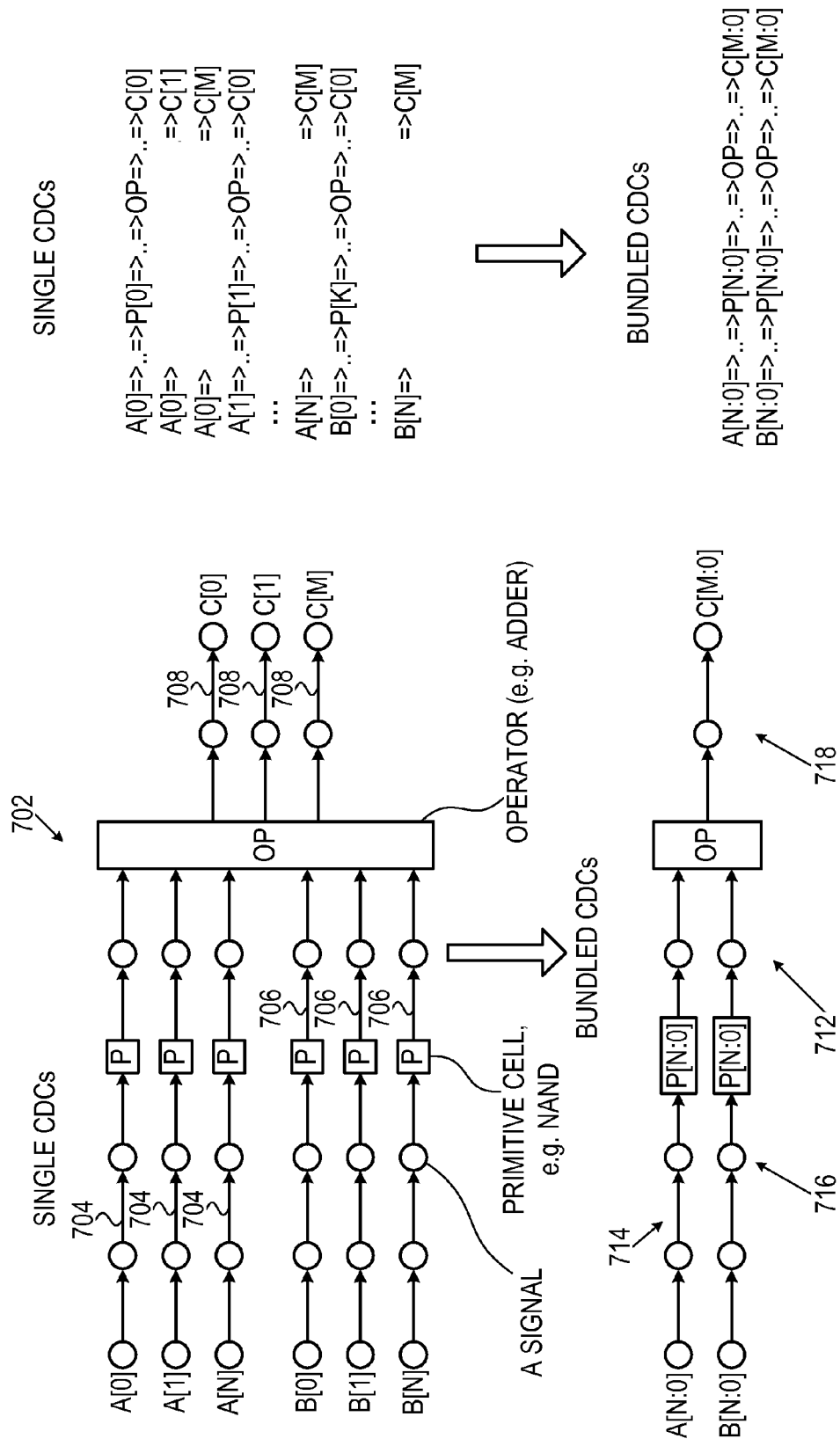
FIG. 7 is a schematic illustration of a bundling process, in accordance with an embodiment of the invention.

FIG. 7 is a schematic illustration of a bundling process, in accordance with an embodiment of the invention. An input circuit 702 includes a plurality of parallel paths 704 performing the same tasks for the bits of a value A, a plurality of parallel paths 706 performing the same tasks for the bits of a value B and a plurality of parallel paths 708 performing the same tasks for the bits of a value C. Each set of parallel branches is identified automatically by processor 138 and converted into a single branch 714, 716 and 718, respectively in a modified circuit 712.

Figure 8:
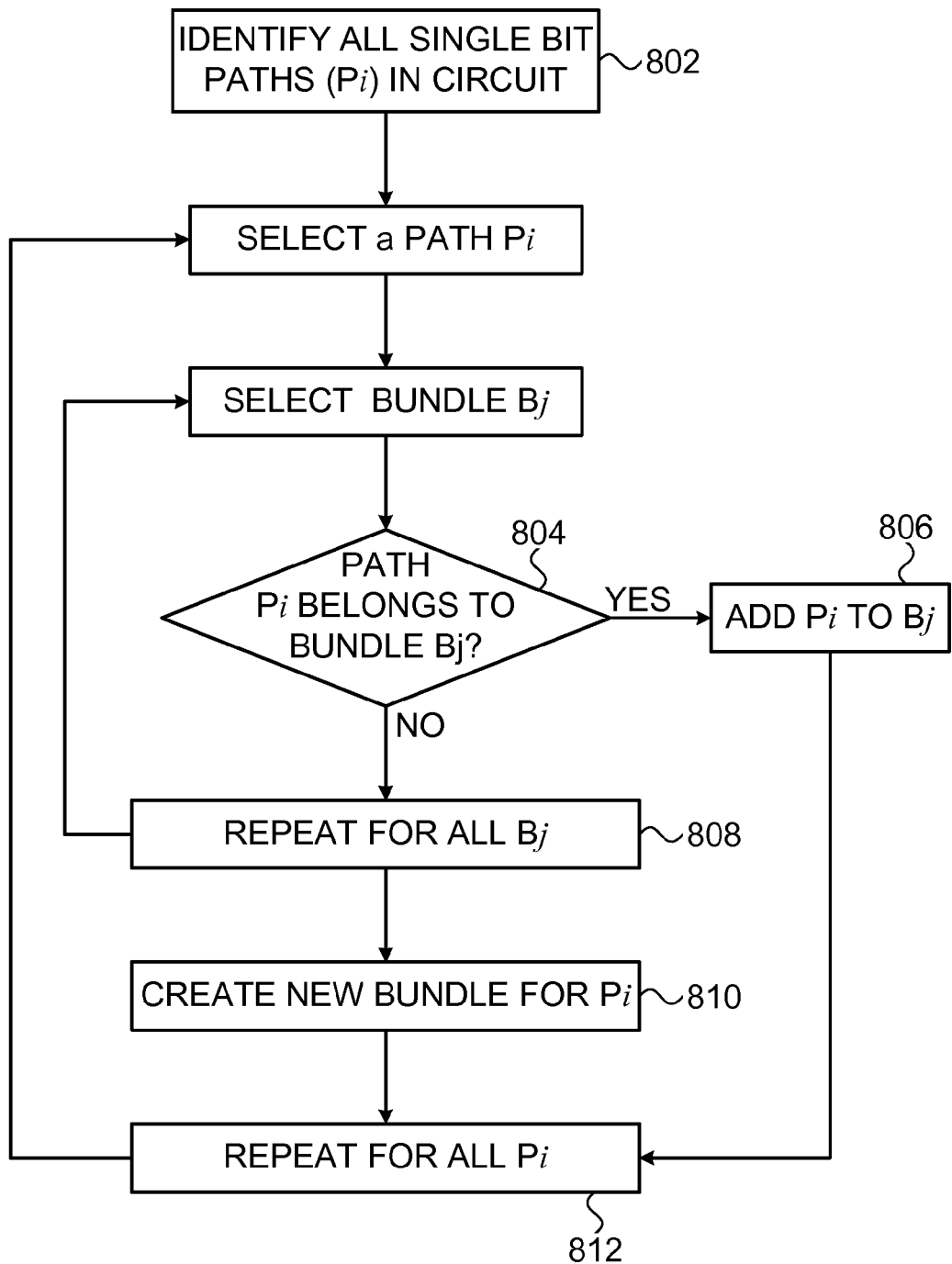
FIG. 8 is a flowchart of acts performed in a bundling process, in accordance with an embodiment of the invention.

FIG. 8 is a flowchart of acts performed in a bundling process, in accordance with an embodiment of the invention. The bundling process optionally identifies all the single bit paths $p_i$ in a circuit to be bundled. For each (810) path $p_i$, the bundles Bj already defined are reviewed (808) to determine whether (804) the path $p_i$ has the same attributes as the bundle Bj. If the path $p_i$ is determined to match a bundle Bj, the path $p_i$ is added (806) to the bundle and a next path is handled. If the path $p_i$, does not belong to any existing bundle, a new bundle is defined (810) for the path $p_i$, and the bundle is given the attributes of the path.

The attributes of the paths and bundles which are compared optionally include source, destination, path length and path stages. Optionally, a path is considered belonging to a bundle only if all the attributes are equivalent. Sources or destinations are optionally considered equivalent if:

For signals: they relate to the same original RTL signal, although not necessarily the same indices thereof, For primitive cells (e.g., flip-flops): they are of the same type, connected to the path through the same output and have the same primitive name, except possibly having different indices For operators: they refer to the same operator instance in the netlist/design and their connections to the path are through the same operator connections For black-boxes: they refer to the same black-box instance in the netlist/design and their connections to the path are through the same connections Path stages are optionally considered equivalent if:

For signals: they relate to the same original RTL signal, although not necessarily the same indices thereof, For primitive cells (e.g., flip-flops): they are of the same type, connected to the path through the same output For operators: their connections to the path are through the same operator connections For black-boxes: they are of the same type and their connections to the path are through the same connections It is noted that the bundling may be performed for all paths or may be performed for a subset of paths, such as paths crossing between clock domains.

The results of the bundling are used in CDC classification to simplify some classification and constraining tasks and/or in order to extend the types of CDC synchronization circuits correctly classified.

The bundling results may also be used in simplifying reports to users, combining warnings or other records relating to a single bundle.

CONCLUSION

It will be appreciated that the above described methods and apparatus are to be interpreted as including apparatus for carrying out the methods and methods of using the apparatus. It should be understood that features and/or steps described with respect to one embodiment may sometimes be used with other embodiments and that not all embodiments of the invention have all of the features and/or steps shown in a particular figure or described with respect to one of the specific embodiments. Tasks are not necessarily performed in the exact order described.

It is noted that some of the above described embodiments may include structure, acts or details of structures and acts that may not be essential to the invention and which are described as examples. Structure and acts described herein are replaceable by equivalents which perform the same function, even if the structure or acts are different, as known in the art. The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A method of circuit design, comprising:
   receiving, by a processor, a description of a multi-clock-domain circuit;
   locating, by the processor, clock domain crossings in the circuit;
   automatically identifying, by the processor, for at least one of the located clock domain crossings, one or more elements of a synchronization circuit of the clock domain crossing, which require constraining, wherein the one or more elements are logic circuit elements; and
   generating a constraint for implementation of the identified one or more elements in a design of the circuit,
   wherein the processor additionally identifies parallel paths which relate to different bits of a same multi-bit data connection and represents the parallel paths by a single path, for the generating of the constraint.

2. The method of claim 1, wherein locating the clock domain crossings comprises assigning a clock domain indication to elements of the circuit and identifying elements located between a plurality of clock domains.

3. The method of claim 1, wherein identifying elements which require constraining for a clock domain crossing comprises determining, by the processor, a class of a synchronization circuit of the clock domain crossing and accessing, by the processor, a library of synchronization circuit classes and corresponding constraining computer readable instructions in a non-transitory computer readable medium.

4. The method of claim 1, wherein generating the constraint comprises generating a constraint for a synthesis stage.

5. The method of claim 1, wherein generating the constraint comprises generating a constraint indicating, to design level applications, that one or more elements should not be optimized.

6. The method of claim 1, wherein generating the constraint comprises generating a constraint for a place and route stage.

7. The method of claim 1, wherein generating the constraint comprises generating a constraint for a data path.

8. The method of claim 1, wherein generating the constraint comprises generating a constraint for a control path.

9. The method of claim 1, wherein generating the constraint comprises generating a constraint for a reset path.

10. The method of claim 1, wherein generating the constraint comprises indicating, to design level applications, that two or more specific flip-flops should be adjacent each other.

11. The method of claim 1, wherein generating the constraint comprises indicating, to design level applications, that two or more specific flip-flops should be included in a single FPGA cell.

12. The method of claim 1, wherein generating the constraint comprises indicating a maximal time delay for a path of a clock domain crossing.

13. The method of claim 12, wherein indicating a maximal time delay for a path of a clock domain crossing comprises indicating a maximal time delay calculated as a function of a desired MTBF of the received circuit description.

14. The method of claim 1, wherein the method further includes indicating a false path that is not subject to time limitations.

15. The method of claim 1, wherein the processor additionally performs CDC verification on the received circuit description.

16. The method of claim 1, wherein the processor additionally performs integration of a plurality of sub-circuits of different time domains into the received circuit description.

17. The method of claim 1, comprising generating a plurality of constraints and comparing the generated constraints to a set of constraints received from a user.

18. The method of claim 1, comprising calculating for the multi-clock-domain circuit a percentage of CDC synchronization circuits properly constrained.

19. A computer software product, comprising a tangible non-transitory computer-readable medium in which program instructions are stored, which instructions, when read by a computer, cause the computer to:
   receive a description of a multi-clock-domain circuit;
   locate in the circuit for clock domain crossings;
   identify for at least one of the located clock domain crossings, one or more elements of a synchronization circuit of the clock domain crossing, which require constraining, wherein the one or more elements are logic circuit elements;
   generate a constraint for the identified one or more elements; and
   identify parallel paths which relate to different bits of a same multi-bit data connection and represent the parallel paths by a single path, for the generating of the constraint.

20. Apparatus for circuit design, comprising:
   an input interface for receiving a description of a multi-clock-domain circuit; and
   a processor configured to locate clock domain crossings in the circuit, to automatically identify for at least one of the located clock domain crossings, one or more elements of a synchronization circuit of the clock domain crossing, which require constraining and to generate a constraint for implementation of the identified one or more elements in a design of the circuit,
   wherein the one or more elements are logic circuit elements; and
   wherein the processor additionally identifies parallel paths which relate to different bits of a same multi-bit data connection and represents the parallel paths by a single path, for the generating of the constraint.

21. The apparatus of claim 20, wherein the input interface is configured to receive a list of constraints for a circuit and wherein the processor is configured to compare constraints it generated for the circuit with the received list of constraints.

* * * * *